(12) United States Patent
Cartmill et al.

(10) Patent No.: US 6,228,296 B1
(45) Date of Patent: May 8, 2001

(54) ROLLED RIGID FOAM

(75) Inventors: Kenneth Ray Cartmill, Lutz; Gregory Wayne Lynn, Clearwater, both of FL (US)

(73) Assignee: Celotex Corporation, Tampa, FL (US)

( * ) Notice: Subject to any disclaimer, the term of this patent is extended or adjusted under 35 U.S.C. 154(b) by 0 days.

(21) Appl. No.: 09/274,055

(22) Filed: Mar. 22, 1999

(51) Int. Cl.$^7$ .................................................. B29C 44/24
(52) U.S. Cl. .................... 264/46.2; 264/46.3; 264/46.5; 264/48; 264/50; 264/53; 264/54; 264/154
(58) Field of Search ................................ 264/45.8, 46.2, 264/321, 295, 154, 46.5, 48, 46.3, 50, 53, 54

(56) References Cited

U.S. PATENT DOCUMENTS

| | | |
|---|---|---|
| 3,860,537 | * 1/1975 | Graham et al. ........................ 264/45.5 |
| 3,927,504 | * 12/1975 | Forrister .................................. 53/430 |
| 4,003,859 | 1/1977 | Reymore, Jr. et al. ............. 260/2.5 AC |
| 4,066,580 | 1/1978 | Falkenstein et al. .............. 260/2.5 AW |
| 4,216,177 | * 8/1980 | Otto ....................................... 264/45.8 |
| 4,318,761 | * 3/1982 | Dockray et al. ...................... 264/46.3 |
| 4,550,547 | * 11/1985 | Wagner, Sr. .............................. 53/430 |
| 4,727,095 | * 2/1988 | Konig et al. ............................ 264/321 |
| 4,789,690 | 12/1988 | Milovanovic-Lerik et al. ..... 521/137 |
| 5,001,165 | 3/1991 | Canady et al. ......................... 521/131 |
| 5,312,848 | 5/1994 | Klapper et al. ........................ 521/172 |

* cited by examiner

Primary Examiner—Allan R. Kuhns
(74) Attorney, Agent, or Firm—Charles W. Vanecek

(57) ABSTRACT

A method for continuously producing a rigid polymer foam in rolled form comprising (a) continuously conveying a carrier along a production line, (b) depositing on the carrier a foam-forming mixture, a regulating means being located on the production line to ensure deposition of only enough of the foam-forming mixture for production, after foaming and curing, of a rigid foam having a maximum thickness of less than 1 inch, (c) foaming and curing the deposited foam-forming mixture to produce a rigid foam, and (d) rolling the rigid foam.

19 Claims, 1 Drawing Sheet

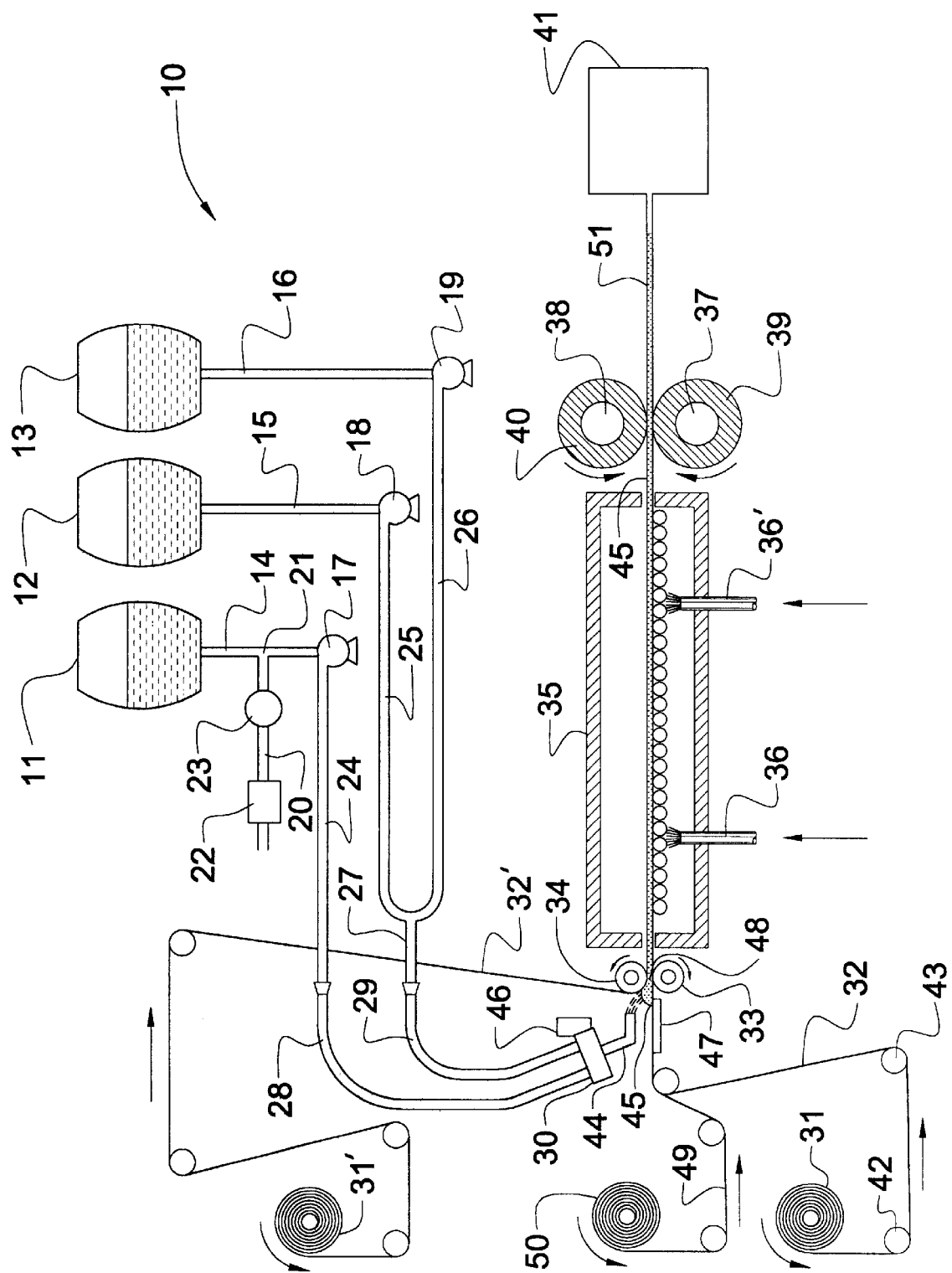

ROLLED RIGID FOAM

BACKGROUND OF THE INVENTION

1. Field of the Invention

This invention relates to the production of rolled, rigid foams, particularly polyurethane and polyisocyanurate foams.

2. Description of the Prior Art

It is known to prepare foam laminates of the kind comprising a rigid layer of foam sandwiched between two skins. These foams, such as the polyurethanes and polyisocyanurates, have been very well accepted for many years because of their well-known advantages and widespread usefulness for structural, insulating and/or decorative purposes.

The rigid foams have excellent structural strength coupled with a relatively low density, and, in their sandwich-type constructions, their rigidity makes them particularly suitable for building purposes. Also, because of their generally closed cell, or substantially closed cell structure, they are superior heat insulators. The presence of the isocyanurate ring structure in the polyisocyanurate foams provides these foams with excellent high temperature properties, particularly an outstanding resistance to deformation at high temperatures.

Although these lightweight faced panels of the prior art are thus of considerable value as rigid and unbent insulating materials, this utilization leaves unaddressed the many areas where curved insulation is needed. If, for example, the highly insulating closed cell polyisocyanurate foams were available as rolled goods, the market for such foams could profitably expand to applications not currently exploited, such as pipe, tank and duct wrap. Furthermore, having such foams in a rolled form would contribute significantly to their manageability in use. A roll of foam would be much easier to transport and handle than the same amount of foam in the form of a number of discrete rigid panels.

OBJECTS OF THE INVENTION

It is accordingly an object of the present invention to provide a rigid, especially closed cell, foam plastic in a rolled form for use as an insulating material.

It is another object of the present invention to provide an apparatus and method for the continuous and efficient manufacture of a rolled, rigid foam plastic.

SUMMARY OF THE INVENTION

The foregoing and other objects of the invention have been achieved by the process and apparatus of the present invention for the continuous production of a rolled, rigid plastic foam structure, wherein a foam-forming mixture is deposited from a dispenser onto a moving carrier, which suitably is a flexible material, and converted to a rigid foam, and the rigid foam is thereafter rolled. Another moving flexible material is advantageously placed over the deposited mixture so that the finished product will have a plastic foam core sandwiched between outer facing materials. The apparatus includes a conveyor assembly for continuously advancing the facing materials, which must be pliable, i.e., capable of being bent or rolled without fracturing, and means for regulating the amount of foam forming mixture which is deposited to provide only enough for formation, after foaming and curing, of a finished foam product having a maximum thickness of less than 1 inch. The width of the rigid foam product can vary widely from about 1 foot to 4 feet or more, depending on the width of the carrier and a predetermined setting of the regulating means. The foam product is formed continuously and its length for eventual use will depend on wherever the product is cut after foaming and curing.

The inventive process is distinguished from a process involving the addition of a foam-forming mixture to a stationary mold which is curved for formation of a rounded foam. The rigid foams formed on the conveyor must not be so thick that rolling them results in breakage. Applicants have found this maximum thickness for workability to be advantageously less than ½ inch, more advantageously less than ¼ inch. That rigid polymer-based foams which have a high closed-cell content can be thus produced is surprising in that the foams' rigidity would seem to prevent such rolling The inventive foams are desirably greater than 75, preferably 80, and more preferably 85, percent closed-cell according to ASTM D2856-A. The rollable polymeric foams which are producible in accordance with the invention can be easily determined through routine experimentation. Polyurethane and polyisocyanurate foams comprise preferred rigid foam plastics of the invention.

The facers of the invention are conveniently flexible material which is in the form of continuous or semicontinuous sheets fed from rolls. A wide variety of materials are employable as the facers, and can be any of the flexible sheet materials conventionally employed in laminated foam insulation products. Such facing materials include, but are not limited to, metals, paper, paperboard, plastics, fiber glass, textiles, asphalt-saturated felts, asphalt fiber glass sheets, metallized plastics, coated plastics and coated papers. The facers may be made from combinations of these materials. In some cases, adhesion can be improved by coating the facing materials before lamination with conventional coating compositions such as vinyl or epoxy compounds. Particularly suitable facers for use in the invention are metallized and coated polymer films, such as metallized and coated polyesters, plain polymer films, papers, and coated papers. Various protective and/or decorative materials may be used on or in the facing materials to make them waterproof, fireproof, etc.

The foamable chemical mixture, which is capable of being formed into a rollable rigid foam, is suitably deposited on the lower facer from a mixing head or other appropriate device which traverses either partially or completely across the width of the facer. The mixture also can be laid down by a stationary device.

After deposition of the foamable mixture and optional application of the upper facer, the resultant composite advances into an expansion zone wherein the foam-forming mixture expands to a cured state. The expansion can be the "free rise" type, such as disclosed in U.S. Pat. No. 4,028,158, where the thickness of the composite is controlled by a gap which is preferably provided by the nip of two rotating rolls. The nip of the two rotating rolls serves as a means for metering the amount of the foamable mixture. Other nip-defining means, as, e.g., the combination of a doctor blade and a fixed plate, or the gap provided by thermal means, such as described in U.S. Pat. No. 5,817,260, also can be employed. The expansion also can be restrained, such as where the foamable material and facer(s) are directed between a pair of spaced conveyor belts which preferably are positioned apart a distance less than the thickness the combination of foam and facer(s) would otherwise ordinarily reach if allowed to foam unrestrictedly.

In the expansion zone, the foamable mixture/facer(s) composite is advantageously subjected to the influence of heat controllably added by the circulation of hot air and cured to a rigid foam structure. In this manner, the resulting faced foam body or slab has two major, relatively flat, parallel surfaces after foaming and curing.

The resulting rigid product is next edge trimmed, and rolled upon itself or on a core to produce a rolled rigid foam which is conveniently sized in finite lengths for shipping. The faced foam must be sufficiently thin so that it can be readily rolled up to form a desirable cylindrical package of insulating material. The product may be perforated to promote water vapor transmission. Faced foams having a thickness of less than 1 inch, preferably less than ¾ inch, and more preferably a thickness in the range of approximately ⅛"–¼" have been found to yield superior rolled products of the invention.

BRIEF DESCRIPTION OF THE DRAWING

The invention will now be described with reference to the accompanying drawing which is a side schematic elevation of an apparatus suitable for producing a rolled, rigid foam laminate in accordance with the present invention.

DETAILED DESCRIPTION OF THE INVENTION

The present invention provides a convenient and economical method for the high speed, continuous production of rolled, rigid foam laminates, whose foam core is beneficially covered or faced by at least one sheet of flexible material. The prefoam chemicals are suitably brought in contact with the flexible sheet which is being continuously advanced along a production line, and are allowed to foam to a completely expanded, rigid state. The rigid foam is thereafter rolled into a transportable form for shipment. The method advantageously includes supplying an upper, flexible facing material over the applied foam-forming mixture. An advancing cover web having a surface nonadherent to the foam may be used in place of the upper or lower facing material, or nonadherent webs may replace both facing materials.

The foam-forming mixture is one which is convertible through the method of the invention to an elongated rigid polymer foam which is thin enough to be rolled into a convenient transportable compact coil for easy handling and shipment. In a preferred embodiment of the invention, the rigid polymer foams comprise the reaction products in the presence of a foaming agent of polyisocyanates and polyfunctional, active hydrogen-containing compounds (hereinafter called "isocyanate-reactive compounds"), especially polyhydroxyl compounds. The foaming action may be carried out in the presence of auxiliaries and additives as required (e.g., a surfactant).

The polyisocyanate component employed in the preparation of the rolled rigid foams of the invention can be any of the polyisocyanates known to be useful in the art of polymer formation. Suitable organic polyisocyanates include aliphatic, cycloaliphatic, araliphatic, aromatic and heterocyclic polyisocyanates and combinations thereof characterized in having two or more isocyanate (NCO) groups per molecule. A preferred group of polyisocyanates are the aromatic polyisocyanates, especially methylene-bridged polyphenyl polyisocyanate mixtures.

Among the many isocyanates suitable for the practice of the subject invention are, for example, tetramethylene, hexamethylene, octamethylene and decamethylene diisocyanates, and their alkyl substituted homologs, 1,2-, 1,3- and 1,4-cyclohexane diisocyanates, 2,4- and 2,6-methyl-cyclohexane diisocyanates, 4,4'- and 2,4'-dicyclohexyl-diisocyanates, 4,4'- and 2,4'-dicyclohexylmethane diisocyanates, 1,3,5-cyclohexane triisocyanates, saturated (hydrogenated) polymethylenepolyphenylenepolyisocyanates, isocyanatomethylcyclohexane isocyanates, isocyanatoethylcyclohexane isocyanates, bis(isocyanatomethyl)-cyclohexane diisocyanates, 4,4'- and 2,4'-bis (isocyanatomethyl) dicyclohexane, isophorone diisocyanate, 1,2-, 1,3-, and 1,4-phenylene diisocyanates, 2,4- and 2,6-toluene diisocyanate, 2,4'-, 4,4'- and 2,2-biphenyl diisocyanates, 2,2'-, 2,4'- and 4,4'- diphenylmethane diisocyanates, polymethylenepolyphenylene-polyisocyanates (polymeric MDI), and aromatic aliphatic isocyanates such as 1,2-, 1,3-, and 1,4-xylylene diisocyanates.

Organic isocyanates containing heteroatoms may also be utilized, for example those derived from melamine. Modified polyisocyanates, such as carbodiimide or isocyanurate can also be employed. Liquid carbodiimide group- and/or isocyanurate ring-containing polyisocyanates having isocyanate contents from 15 to 33.6 percent by weight, preferably from 21 to 31 percent by weight, are also effective, for example, those based on 4,4'-, 2,4'-, and/or 2,2'-diphenylmethane diisocyanate and/or 2,4- and/or 2,6-toluene diisocyanate, and preferably 2,4- and 2,6-toluene diisocyanate and the corresponding isomer mixtures, 4,4'-, 2,4', and 2,2'-diphenylmethane diisocyanates as well as the corresponding isomer mixtures, for example, mixtures of 4,4'- and 2,4'-diphenylmethane diisocyanates, mixtures of diphenylmethane diisocyanates and polyphenyl polymethylene polyisocyanates (polymeric MDI), and mixtures of toluene diisocyanates and polymeric MDI. Preferred, however, are the aromatic diisocyanates and polyisocyanates. Particularly preferred are 2,4-, and 2,6-toluene diisocyanate and mixtures thereof (TDI), 2,4'-, 2,2'- and 4,4'-diphenylmethane diisocyanate (MDI), polymethylenepolyphenylenepolyisocyanates (polymeric MDI), and mixtures of the above preferred isocyanates. Most particularly preferred are the polymeric MDI's.

Still other useful organic polyisocyanates are isocyanate terminated quasi-prepolymers. These quasi-prepolymers are prepared by reacting excess organic polyisocyanate or mixtures thereof with a minor amount of an active hydrogen-containing compound. Suitable active hydrogen containing compounds for preparing the quasi-prepolymers hereof are those containing at least two active hydrogen-containing groups which are isocyanate reactive. Typifying such compounds are hydroxyl-containing polyesters, polyalkylene ether polyols, hydroxyl-terminated polyurethane oligomers, polyhydric polythioethers, ethylene oxide adducts of phosphorous-containing acids, polyacetals, aliphatic polyols, aliphatic thiols including alkane, alkene and alkyne thiols having two or more SH groups; as well as mixtures thereof. Compounds which contain two or more different groups within the above-defined classes may also be used such as, for example, compounds which contain both an SH group and an OH group. Highly useful quasi-prepolymers are disclosed in U.S. Pat. No. 4,791,148 and U.S. application Ser. No. 07/342,508, filed Apr. 24, 1989, the disclosures of which with respect to the quasi-prepolymers are hereby incorporated by reference.

In addition to the polyisocyanate, the foam-forming formulation also contains an organic compound containing at least 1.8 or more isocyanate-reactive groups per molecule (an isocyanate-reactive compound). Suitable such compounds include polyols, polyamines, polyacids, polymercaptans and like compounds. Preferred isocyanate-reactive compounds are the polyester and polyether polyols. Particularly preferred are polyester polyols, especially aromatic polyester polyols, and mixtures of the polyester and polyether polyols.

The polyester polyols can be prepared by known procedures from a polycarboxylic acid component comprising a polycarboxylic acid or acid derivative, such as an anhydride or ester of the polycarboxylic acid, and any polyol component. The polyol component advantageously comprises a glycol(s) or a glycol-containing mixture of polyols. The polyacid and/or polyol components may, of course, be used as mixtures of two or more compounds in the preparation of the polyester polyols. Particularly suitable polyester polyols for use in the foam production are aromatic polyester polyols containing phthalic acid residues.

The production of the polyester polyols is accomplished by simply reacting the polycarboxylic acid or acid derivative with the polyol component in a known manner until the hydroxyl and acid values of the reaction mixture fall in the desired range. After transesterification or esterification, the reaction product can be reacted with an alkylene oxide to form a polyester polyol mixture of the invention. This reaction desirably is catalyzed. The temperature of this process should be from about 80° to 170° C., and the pressure should generally range from about 1 to 40 atmospheres.

The polycarboxylic acid component, which is preferably dibasic, may be aliphatic, cycloaliphatic, aromatic and/or heterocyclic and may optionally be substituted, for example, by halogen atoms, and/or may be unsaturated. Examples of suitable carboxylic acids and derivatives thereof for the preparation of the polyester polyols include: oxalic acid; malonic acid; succinic acid; glutaric acid; adipic acid; pimelic acid; suberic acid; azelaic acid; sebacic acid; phthalic acid; isophthalic acid; trimellitic acid; terephthalic acid; phthalic acid anhydride; tetrahydrophthalic acid anhydride; pyromellitic dianhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dibasic and tribasic unsaturated fatty acids optionally mixed with monobasic unsaturated fatty acids, such as oleic acid; terephthalic acid dimethyl ester and terephthalic acid-bis glycol ester.

Polyester polyols whose acid component advantageously comprises at least about 30% by weight of phthalic acid residues are particularly useful. By phthalic acid residue is meant the group

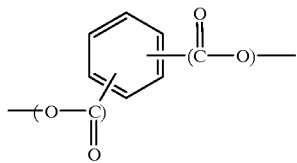

While the aromatic polyester polyols can be prepared from substantially pure reactant materials, more complex ingredients are advantageously used, such as the side-stream, waste or scrap residues from the manufacture of phthalic acid, terephthalic acid, dimethyl terephthalate, polyethylene terephthalate, adipic acid and the like. Particularly suitable compositions containing phthalic acid residues for use in the invention are (a) ester-containing by-products from the manufacture of dimethyl terephthalate, (b) scrap polyalkylene terephthalates, (c) phthalic anhydride, (d) residues from the manufacture of phthalic acid or phthalic anhydride, (e) terephthalic acid, (f) residues from the manufacture of terephthalic acid, (g) isophthalic acid, (h) trimellitic anhydride, and (i) combinations thereof. These compositions may be converted by reaction with the polyols of the invention to polyester polyols through conventional transesterification or esterification procedures.

A preferred polycarboxylic acid component for use in the preparation of the aromatic polyester polyols is phthalic anhydride. This component can be replaced by phthalic acid or a phthalic anhydride bottoms composition, a phthalic anhydride crude composition, or a phthalic anhydride light ends composition, as such compositions are defined in U.S. Pat. No. 4,529,744. Other preferred materials containing phthalic acid residues are polyalkylene terephthalates, especially polyethylene terephthalate (PET), residues or scraps.

Still other preferred residues are DMT process residues, which are waste or scrap residues from the manufacture of dimethyl terephthalate (DMT).

The polyester polyols are prepared from the above-described polycarboxylic acid components and any polyol component. The polyols can be aliphatic, cylcloaliphatic, aromatic and/or heterocyclic, and advantageously are selected from the group consisting of diols, triols, and tetrols. Low molecular weight aliphatic polyhydric alcohols, such as aliphatic dihydric alcohols having no more than about 20 carbon atoms are highly satisfactory. The polyols optionally may include substituents which are inert in the reaction, for example, chlorine and bromine substituents, and/or may be unsaturated. Suitable amino alcohols, such as, for example, monoethanolamine, diethanolamine, triethanolamine, or the like may also be used. Moreover, the polycarboxylic acid(s) may be condensed with a mixture of polyhydric alcohols and amino alcohols. Suitable polyol side stream sources include ethylene glycol, diethylene glycol, triethylene glycol and higher homologs or mixtures thereof. The similar homologous series of propylene glycols can also be used.

A preferred polyol component is a glycol. The glycols may contain heteroatoms (e.g., thiodiglycol) or may be composed solely of carbon, hydrogen, and oxygen. They are advantageously simple glycols of the general formula $C_nH_{2n}(OH)_2$ or polyglycols distinguished by intervening ether linkages in the hydrocarbon chain, as represented by the general formula $C_nH_{2n}O_x(OH)_2$. In a preferred embodiment of the invention, the glycol is a low molecular weight aliphatic diol of the generic formula:

HO—R—OH wherein R is a divalent radical selected from the group consisting of:

(a) alkylene radicals containing from 2 through 6 carbon atoms, and (b) radicals of the formula:

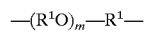

wherein $R^1$ is an alkylene radical containing from 2 through 6 carbon atoms, and m is an integer of from 1 through 4, and (c) mixtures thereof.

Examples of suitable polyol components for preparation of the polyester polyols are ethylene glycol; propylene glycol-(1,2) and -(1,3); butylene glycol-(1,4) and -(2,3); hexane diol-(1,6); octane diol-(1,8); neopentyl glycol; 1,4- bishydroxymethyl cyclohexane; 2-methyl-1,3-propane diol; glycerin; trimethylolpropane; trimethylolethane; hexane triol-(1,2,6); butane triol-(1,2,4); pentaerythritol; quinol; mannitol; sorbitol; methyl glucoside; diethylene glycol; triethylene glycol; tetraethylene glycol and higher polyethylene glycols; dipropylene glycol and higher polypropylene glycols as well as dibutylene glycol and higher polybutylene glycols. Especially suitable polyols are alkylene glycols and oxyalkylene glycols, such as ethylene glycol, diethylene glycol, dipropylene glycol, triethylene glycol, tripropylene glycol, tetraethylene glycol, tetrapropylene glycol, trimethylene glycol and tetramethylene glycol, and 1,4-cyclohexanedimethanol (1,4-bis-hydroxymethylcyclohexane).

The term "polyester polyol" is used in this specification and claims in the conventional sense and includes any unreacted polyol (e.g., glycol) used in and remaining after the preparation of the polyester polyol and/or unesterified polyol added after the preparation. The unreacted glycol is commonly called "free glycol." The polyester polyol can advantageously include up to about 10% weight percent free glycol.

The polyester polyols advantageously have an average functionality of about 1.8 to 8, preferably about 1.8 to 5, and more preferably about 2 to 2.5. Their hydroxyl number values generally fall within a range of about 15 to 750, preferably about 30 to 550, and more preferably about 100 to 550, their free glycol content generally is from about 0 to 40, preferably from 2 to 30, and more preferably from 2 to 15, weight percent of the total polyester polyol component, and their acid number is about 0.2 or greater, such as described in U.S. Pat. No. 5,789,458.

Other polyols which can be employed alone or in combination with at least one other isocyanate-reactive component (e.g., polyester polyol) in the preparation of the rigid foams of the invention include monomeric polyols and polyether polyols. The polyether polyols include the linear and branched chain polyethers which have a plurality of acylic ether oxygens and contain at least 1.8 isocyanate-reactive groups and preferably 3 or more (e.g., 4–8). The polyethers typically have molecular weights, based on their hydroxyl value, ranging from 250 to 7500. The polyether polyols are found particularly useful in preparing rigid polyurethane foams. Polyether polyols of this type are the reaction products of a polyfunctional active hydrogen initiator and a monomeric unit such as ethylene oxide, propylene oxide, butylene oxide, tetrahydrofuran, styrene oxide, epichlorohydrin, optionally as mixtures or successively, preferably propylene oxide, ethylene oxide or mixed propylene oxide and ethylene oxide.

A wide variety of initiators may be alkoxylated to form useful polyether polyols. Examples of such starting components include ethylene glycol, 1,2- or 1,3- propanediol, 1,2-, 1,3-, or 1,4-butanediol, polyethylene glycol, polypropylene glycol, hexanetriol, glycerine, sorbitol, trimethylolpropane, pentaerythritol, sucrose and other carbohydrates, 4,4-dihydroxydiphenylpropane, aniline, 2,4- or 2,6-diaminotoluene, ammonia, monoethanolamine, diethanolamine, triethanolamine, and ethylene diamine.

The polymer foams of the present invention can be prepared by using standard techniques known to those skilled in the art. The preferred polyisocyanurate and polyurethane foams may be formed by mixing together the organic polyisocyanate with the isocyanate-reactive compound (e.g., polyol) and other foam-forming ingredients as required, including the blowing agent and other additives (e.g., a catalyst and surfactant) at a suitable temperature, such as from about 0° C. To 150° C. In the case of the polyurethanes, a polyol and polyisocyanate are generally reacted on a 1:1 to 1:1.25 equivalent basis. In an advantageous embodiment of the invention wherein the polyester polyols are combined with another polyol(s) to produce polyurethane foams, the polyester polyols can comprise about 5 to 100, preferably about 5 to 75, and more preferably about 20 to 50, weight percent of the total polyol content in the foam preparations. The polyisocyanurate foams of the invention are advantageously prepared by reacting the polyisocyanate with a minor amount of polyol, such as sufficient polyol to provide about 0.10 to 0.70 hydroxyl equivalents of polyol per equivalent of said polyisocyanate, wherein the polyester polyol suitably comprises about 5 to 100, and preferably about 50 to 100, weight percent of the total polyol content in the foam preparations.

Any suitable blowing agent or mixture of blowing agents can be employed in the foam compositions of the present invention. Water, air, nitrogen, carbon dioxide, readily volatile organic substances and/or compounds which decompose to liberate gases (e.g., azo compounds may be used). Preferably, the blowing agent of the invention includes no completely halogenated chlorofluorocarbon. Typical blowing agents of the invention have a boiling point between −50° C. and +100° C., and preferably between −50° C. and +50° C. Hydrocarbons and halohydrocarbons are preferred agents. In one advantageous embodiment of the invention, water is not used as a blowing agent in the rigid foam-forming compositions.

Especially suitable blowing agents are hydrogen atom-containing compounds, which can be used alone or as mixtures with each other or with another type of co-blowing agent. These blowing agents can be selected from a broad range of materials, including hydrocarbons, ethers, esters and partially halogenated hydrocarbons, ethers and esters, and the like. Among the usable hydrogen-containing blowing agents are the HCFCs such as 1,1-dichloro-1-fluoroethane, 1,1-dichloro-2,2,2-trifluoro-ethane, monochlorodifluoromethane, and 1-chloro-1,1-difluoroethane; the HFCs such as 1,1,1,3,3,3-hexafluoropropane, 2,2,4,4-tetrafluorobutane, 1,1,1,3,3,3-hexafluoro-2-methylpropane, 1,1,1,3,3-pentafluoropropane, 1,1,1,2,2-pentafluoropropane, 1,1,1,2,3-pentafluoropropane, 1,1,2,3,3-pentafluoropropane, 1,1,2,2,3-pentafluoropropane, 1,1,1,3,3,4-hexafluorobutane, 1,1,1,3,3-pentafluorobutane, 1,1,1,4,4,4-hexafluorobutane, 1,1,1,4,4-pentafluorobutane, 1,1,2,2,3,3-hexafluoropropane, 1,1,1,2,3,3-hexafluoropropane, 1,1-difluoroethane, 1,1,1,2-tetrafluoroethane, and pentafluoroethane; the HFEs such as methyl-1,1,1-trifluoroethylether and difluoromethyl-1,1,1-trifluoroethylether; and the hydrocarbons such as n-pentane, isopentane, and cyclopentane.

The blowing agents are employed in an amount sufficient to give the resultant rigid foam the desired bulk density which is generally between 0.5 and 10, preferably between 1 and 5, and most preferably between 1.5 and 2.5, pounds per cubic foot. The blowing agents generally comprise from 1 to 30, and preferably comprise from 5 to 20 weight percent of the composition. When a blowing agent has a boiling point at or below ambient, it is maintained under pressure until mixed with the other components.

Any of the catalysts conventionally employed in the art to catalyze the reaction of an isocyanate with an isocyanate-reactive compound can be employed in the foam preparations of the invention. Such catalysts include organic and inorganic acid salts of, and organometallic derivatives of, bismuth, lead, tin, iron, antimony, uranium, cadmium, cobalt, thorium, aluminum, mercury, zinc, nickel, cerium, molybdenum, vanadium, copper, manganese, and zirconium, as well as phosphines and tertiary organic amines. Examples of such catalysts are dibutylin dilaurate, dibutyltin diacetate, stannous octoate, lead octoate, colbalt naphthenate, triethylamine, triethylenediamine, N,N,N',N'-tetramethylethylenediamine, 1,1,3,3-tetramethylguanidine, N,N,N'N'-tetramethyl-1,3-butanediamine, N,N-dimethylethanolamine, N,N-diethylethanolamine, and the like.

In the preparation of the polyisocyanurate rigid foams, any catalyst that will induce reaction of the isocyanate with the polyol and will induce isocyanurate ring formation can be employed in the foam preparations of the invention. Most commonly used trimerization catalysts also function to catalyst the reaction of polyol and isocyanate to form urethane. However, a separate catalyst may, if desired, be used for urethane formation. The trimerization catalysts include metal carboxylates, tertiary amine trimerization catalysts, quaternary ammonium carboxylates, alkali metal alkoxides, alkali metal phenoxides and the like. Representative metal carboxylates are sodium and potassium formates, acetates, and 2-ethylhexanoates. Tertiary amine catalysts include 1,3,5-tris (N,N-dimethylaminopropyl)-s-hexahydrotriazine, o- and p-(dimethylaminomethyl) phenols and 2,4,6-tris(dimethylaminomethyl) phenol and the quaternary ammonium salts include N-hydroxyl-alkyl quaternary ammonium carboxylates and tetramethylammonium formate, acetate, 2-ethylhexanoate and the like. Suitable urethane catalysts include, for instance, tertiary amines such as triethyl amine, N,N-dimethylcyclohexylamine, pentamethyldiethlenetriamine and N,N-dimethylethanolamine as well as 1,4-diazabicyclo [2.2.2] octane and organo tin compounds such as dibutyltin diacetate, stannous octoate and dibutyltin dilaurate.

The catalyst or catalyst mixture is used in a catalytically effective amount. Generally, the catalyst comprises from about 0.1 to 20, preferably from about 0.3 to 10, weight percent of the total foam-forming composition.

Any suitable surfactant can be employed in the foams of this invention. Successful results have been obtained with silicone/ethylene oxide/propylene oxide copolymers as surfactants. Examples of surfactants useful in the present invention include, among others, polydimethylsiloxane-polyoxyalkylene block copolymers available from OSi Specialties, Inc. under the trade names Y-10222, Y-10764, Y-10816, Y-10884, L-5420 and L-5340, from the Dow Corning Corporation under the trade names DC-193 and DC-5315, and from Goldschmidt Chemical Corporation under the tradenames B-8408, B-8407, and B-8471. Other suitable surfactants are polyoxy-alkylene/unsaturated diester reaction products, which are described in U.S. Pat. No. 4,365,024. It has been found that surfactants such as Y-10764 and Y-10816 can contribute significantly to an increase in foam insulation value. Generally, the surfactant comprises from about 0.05 to 10, and preferably from 0.1 to 6, weight percent of the foam-forming composition.

Other additives may also be included in the foam formulations. Included are processing aids, viscosity reducers, such as 1-methyl-2-pyrrolidinone, propylene carbonate, nonreactive and reactive flame retardants, such as tris(2-chloroethyl)-phosphate and a mixture of B-chloropropyl phosphate esters with isomeric chloropropyl groups wherein the isopropyl structure predominates, dispersing agents, reinforcing agents, plasticizers, mold release agents, stabilizers against aging and weathering, fungistatic and bacteriostatic substances, dyes, compatibility agents, fillers and pigments (e.g., carbon black and silica). The use of such additives is well known to those skilled in the art.

An apparatus 10 suitable for use in connection with the present invention is shown schematically in the drawing. The apparatus includes tanks 11, 12 and 13 for containing the foamable ingredients. The tanks are charged with the foam-forming mixture in whatever manner is preferred for a given mixture. For instance, in the production of an isocyanurate foam, the foam-forming mixture can be divided into three liquid components with the polyisocyanate, surfactant and all or a portion of the blowing agent in the tank 11, the polyester polyol and any remainder of the blowing agent in the tank 12, and the catalyst in tank 13, each respectively connected to outlet lines 14, 15 and 16. The temperatures of the ingredients are controlled to insure satisfactory processing. The lines 14, 15 and 16 form the inlet to metering pumps 17, 18 and 19. The apparatus is also provided with a storage tank (not shown) for a frothing agent. This tank discharges into conduit 20 which opens at "T"-intersection 21 into line 14. A check valve 22 and ball valve 23 in conduit 20 ensure no backup of material toward the frothing agent storage tank. The frothing agent instead can be introduced in the same way into line 15 or both lines 14 and 15. The pumps 17, 18 and 19 discharge respectively through lines 24, 25 and 26. Lines 25 and 26 comprise branches which open into line 27, and lines 24 and 27 are in turn respectively connected to flexible lines 28 and 29. The flexible lines 28 and 29 discharge to mixing head 30.

As shown in the drawing, the apparatus is provided with flexible facing materials or sheets fed from supply rolls, i.e., a roll 31 of lower facing material 32, and a roll 31' of upper facing material 32'. Where only a lower facing material is used, the upper facing material can be replaced with a web coated with a release agent. The apparatus is also provided with metering rolls 33 and 34, and an oven 35 provided with vents 36 and 36' for introducing and circulating hot air. The apparatus also includes pull rolls 37 and 38, each of which preferably has a flexible outer sheath 39 and 40, and a winding station 41. Cutting means for cutting off side excess material and for severing the faced foam plastic produced into finite lengths, such as described in U.S. Pat. No. 5,817,260, are used to provide product having the desired width and length. Advantageously, the width of the foam laminate is about 2 to 4 feet and the length of the foam laminate is about 25 to 100 feet.

As an example of the operation, the speeds of the pumps 17, 18 and 19 are adjusted to give the desired ratios of the ingredients contained in the tanks 11, 12 and 13, whereupon these ingredients pass respectively into lines 14, 15 and 16. When a froth-foaming process is conducted, the frothing agent is injected into line 14 upstream of metering pump 17. The ingredients pass through lines 24, 25 and 26, as well as lines 27, 28 and 29, whereupon they are mixed in the mixing head 30 and deposited therefrom. By virtue of rotation of the pull rolls 37 and 38, the lower facing material is pulled from the roll 31, whereas the upper facing material is pulled from the roll 31'. The facing material passes over idler rollers such as idler rollers 42 and 43 and is directed to the nip between the rotating metering rolls 33 and 34.

Various application devices, both stationary and moving, may be employed in depositing the chemicals. Even distribution of the foamable mix over the surface of the sheet material can be achieved by dispensing the chemicals from applicators having one or more delivery heads. In one preferred embodiment, applicator 44 comprises a nozzle which is reciprocated transversely of the sheet 32 to supply a stream of a liquid foamable mixture 45 uniformly there-across. The back and forth movement of the mixing head and applicator is caused by a reciprocating means 46. In another preferred embodiment involving the deposition of froth chemicals, the mixing head 30 deposits the foamable chemicals through an applicator capable of laying down a wide band of froth on lower sheet 32. Advantageously, the applicator can be oscillated transversely a short distance to either side of a central point above sheet 32.

As shown in the drawing, the start or upstream end of the production line beneficially includes a smooth-topped platform or bed 47 which extends from upstream of the deposition point of the foamable mixture to a point upstream of and adjacent the constricting nip 48 between closely spaced parallel rollers 33 and 34. Lower sheet 32 moves downstream in a horizontal plane along the upper surface of bed plate 47 positioned as illustrated in the drawing. Bedplate 47 is adjustably mounted so that it can be inclined from the horizontal to elevate its downstream transverse edge (adjacent nip 48) above its upstream transverse edge. An improved control of the foam chemical bank has been achieved by thus tilting the conveying sheet 32 so that it and foamable chemicals thereon advance with an upward slope upstream of the nip-defining rollers.

Immediately downstream of the laydown point of the foamable chemicals, upper facing sheet 32' is brought into contact with the top surface of the chemicals. As illustrated in the drawing, this contact is suitably effected by passing upper sheet 32' around roller 34 and through nip 48. In another favorable embodiment of the invention, the foamable mixture can be dispensed through applicator 44 onto the exposed surface of the sheet 32' as the latter passes around roller 34. In any event, between cylindrical rollers 33 and 34 the upper and lower facing sheets are brought together in surface-to-surface opposition relative to each other, with the foamable mixture sandwiched in between. As the facing sheets are brought into closely spaced adjacency between rollers 33 and 34, the constriction at nip or gap 48 causes a rolling bank of foamable mixture to build up, whereby there is a surplus or backlog of material available to pass through the nip of the rolls. One or both of rollers 33 and 34 are advantageously vertically shiftable for control of the thickness of the facers and foamable mixture passing through the nip.

The rolled foam products of the invention can contain various reinforcement materials. As shown in the drawing, a reinforcing web 49 can be fed into the apparatus. One or more of the reinforcing webs may be used. The reinforcing web(s) may be variously introduced, e.g., below the foamable chemicals, as in the drawing, above the chemicals, or both below and above them. Fiberglass fibers constitute a preferred web material. For example, in a preferred embodiment the reinforcing web will be the type of expandable glass mat used in producing the structural laminate of U.S. Pat. No. 4,028,158, i.e., a thin mat of long, generally straight glass fibers. By generally following the method of foam reinforcement described in Example 1 of U.S. Pat. No. 4,028,158 and utilizing a foam-forming mixture having the consistency of the liquid foamable mixture of this example, the glass mat becomes distributed within the foam core. In accordance with this embodiment, a thin mat 49 of glass fibers is fed from roll 50 toward the nip between the two rotating metering rolls 33 and 34. By virtue of rotation of the pull rolls 37 and 38, reinforcing mat 49 is pulled from its roll, through the nip of the metering rolls and downstream to form an expanded reinforcement material in the resulting structural laminate.

When the foam-forming mixture deposited on the underlying substrate during the process is in the form of a froth, an included reinforcing web, such as the thin glass mat of U.S. Pat. No. 4,028,158, will be pushed under the influence of the expanding froth to a position adjacent and interior to its associated facing sheet. In this way, a reinforcing web(s) can be placed interior to the lower or upper facing sheet or to both, as described in U.S. Pat. No. 4,572,865, the disclosure of which patent with respect to such reinforced structural laminates is hereby incorporated by reference.

The nip or gap 48 formed between the rolls 33 and 34 is accurately adjustable so as to insure contact of the foamable mixture with the facing sheets and any reinforcing material and cause the desired uniform distribution of the mixture across the width of the sheets. Rolls 33 and 34 thus serve as a device to meter the amount of chemicals being passed downstream for formation of the desired board thickness. One or both of the metering rolls may be profiled in a known manner to locally vary the thickness of nip 48, e.g., by providing a reduced gap in the center to attain a concomitant reduction in the center of the foam core. Another way to vary the shape of the metering gap is by controlling the temperature of one or both of the metering rolls as disclosed in U.S. Pat. No. 5,817,260, issued Oct. 6, 1998, which is incorporated herein by reference.

Also, the intervening space between the rolls can be varied by movement of one or both of the rolls. For this purpose, upper roll 34 is suitably mounted on an adjustable support which permits the distance between its axis and the axis of lower metering roll 33 to be varied so that the nip between the rolls can be adjusted from a wide gap to almost a zero setting. This arrangement provides a high degree of control of the final thickness in the resulting foam board, with the foamable mixture being allowed to expand thereafter substantially freely to develop its natural rise profile. The metering rolls thus serve as a means for bringing the facing sheets into spaced conjunction, and for distributing the foamable mixture therebetween, as well as performing a final metering operation, supplementing the initial rough metering afforded by applicator 44.

After the faced foam-forming mixture goes between the nip of the two rolls and 34, it passes into oven 35 and on along the generally horizontally extending production line, as shown in the drawing. Oven 35 provides an expansion zone for the foam-forming mixture (e.g., a polyurethane or polyisocyanurate foam-forming mix). By varying the temperature of hot air from vents 36 and 36', the temperature within the oven 35 is maintained within the desired limits of 100° F. to 300° F., and preferably 175° F. to 250° F. The foam, under the influence of the heat added to the oven, cures to form faced foam plastic 51. The product 51 then leaves the oven 35, passes between the pull rolls 37 and 38, and is cut to an appropriate width and length and shaped into the rolled, rigid foam laminate of the invention.

The present invention is further illustrated by the following examples in which all parts and percentages are by weight unless otherwise indicated.

EXAMPLE

This example illustrates the continuous production of rolled rigid foam laminates by reference to the drawing.

The foam laminates were prepared by a free-rise process from the ingredients and quantities thereof shown in the following Table 1.

TABLE 1

INGREDIENTS

| | Parts |
|---|---|
| A-Component | |
| Isocyanate[1] | 187.5 |
| HCFC-141b | 10.2 |
| HCFC-22 | 6.9 |
| Silicone surfactant | 2.2 |
| B-Component | |
| Polyol[2] | 119.0 |
| HCFC-141b | 29.2 |
| C-Component | |
| Catalyst[3] | 9.7 |

[1]Isocyanate = polymethylene polyphenyl isocyanate which has an equivalent weight of 138, an acidity of 0.02% HCl, and viscosity of 2,000 centipoises at 25° C., and is available from Bayer Corporation under the trademark Mondur MR-200.
[2]Polyol = aromatic polyester polyol which has an equivalent weight of 236 and a viscosity at 25° C. of 3200 centipoises, and is available from Hoechst under the trademark Terate 2541.
[3]Catalyst = mixture of 42.11% potassium octoate (70% in DEG), 4.84% 2,4,6-tris [dimethyaminomethyl ]phenol, 17.20% Dabco TMR-2 of Air Products and Chemicals, and 35.85% polyethlene glycol.

Components A, B and C were pumped from tanks 11, 12 and 13, respectively. Top facer 32' and bottom facer 32 were each a 48 gauge metallized polyester sheet with Scharr Industries 3312 coating at 1.7 lb/3MSF.

With the oven 35 heated to 210° F. first zone and 220° F. second zone, the facers were fed toward the nip of metering rolls 33 and 34, and the pumps 17, 18 and 19 were started to discharge the contents of tanks 11, 12 and 13 into the respective feed lines to carry the ingredients to the mixing head 30. The mixing head 30 deposited the foam forming mixture onto the lower facer and both upper and lower facers and foamable mixture were then conveyed through the regulating gap 48 provided by metering rolls 33 and 34. Roll 34 was flat with no crown. The composite was conveyed through the oven to produce a foam laminate which had a consistent CD (cross direction) profile with a mean thickness of 0.154" and a thickness range of 0.025". No blocking was detected during or subsequent to production. The laminate was cut by side edge and length cutting means, and rolled into products having a width of 48 inches and length of 50 feet.

Various properties of the resulting laminate are reported in Table 2 below. The results of Table 2 reveal that the laminate possesses a combination of desirable properties.

The laminate can readily be held in place with ordinary fasteners. Samples were fastened with staples (1" crown×2" leg) to a wood stud wall with no breaking of the facer. The workability of the product is again demonstrated by its scrub resistance. When samples were subjected to a scrub resistance test (ASTM D2486, with plastic backing support), they notably endured 33 scrubs. Additionally, samples which were subjected to 158° F./95% R.H. for 14 days did not experience any facer delamination or oxidation of the metallized surface.

To further assess the product's durability under adverse conditions, samples were subjected to Florida outdoor weathering, southern exposure on a vertical wall, for 90 days. The weathered samples exhibited no bowing, warping or other aesthetically displeasing attributes. A puncture strength test (ASTM 4830) was run on the weathered samples and compared to a control. Weathering resulted in a 20% reduction in puncture resistance.

TABLE 2

PROPERTIES OF FOAM LAMINATES

| Foam Laminate | |
|---|---|
| Nominal Thickness, in | 0.13 |
| Core Density, pcf | 1.96 |
| Compressive Strength, psi | 7 |
| ASTM E84 Tunnel | |
| Flame spread | 31 |
| Smoke | 34 |
| k-factor, Btu-in/hr - ft$^2$ -° F. | |
| Initial | 0.121 |
| 90 day/140° F. | 0.125 |
| Water Vapor Transmission, perms | <1 |
| Scrub Resistance, cycles | 33 |
| ASTM D2486 with plastic backing support | |

We claim:

1. A method for the continuous manufacture of a closed cell, rigid polymer foam in rolled form which comprises
   (a) continuously conveying a carrier along a production line,
   (b) depositing on top of the carrier a foam-forming mixture capable of formation into a closed cell, rollable rigid foam having a thickness less than 1 inch, a regulating means being located on the production line to provide only enough of the foam-forming mixture for production, after foaming and curing, of a rigid foam having a maximum thickness of less than 1 inch,
   (c) foaming and curing, at a temperature of 100° F. to 300° F., the continuously moving foam-forming mixture resulting from step (b) to produce a closed cell, rollable rigid foam, and
   (d) rolling the rigid foam,
wherein the carrier comprises a lower, flexible facing sheet, and an upper, flexible facing sheet is provided above the deposited mixture before foaming and curing.

2. The method of claim 1 wherein the thickness of the rollable rigid foam is less than ¼ inch.

3. The method of claim 1 wherein the exposed surface of each facing sheet is independently coated with a protective material, a decorative material or a combination thereof.

4. The method of claim 1 wherein each facing sheet is independently selected from the group consisting of metals, paper, paperboard, plastics, fiberglass, textiles, asphalt-saturated felts, asphalt fiberglass sheets, metallized plastics, coated plastics, coated papers and combinations thereof.

5. The method of claim 1 wherein the rollable rigid foam is perforated after foaming and curing and before rolling.

6. The method of claim 1 wherein each facing sheet comprises a metallized and coated polymer film.

7. The method of claim 1 wherein the width of the rollable rigid foam is about 2 to 4 feet and the length of the rollable rigid foam is about 25 to 100 feet.

8. The method of claim 1 wherein the thickness of the rollable rigid foam is less than ½ inch.

9. The method of claim 1 wherein the foam-forming mixture comprises a mixture for forming a rigid polymer foam selected from the group consisting of polyurethane and polyisocyanurate foams.

10. The method of claim 9 wherein the thickness of the rollable rigid foam is about ⅛ to ½ inch.

11. The method of claim 9 wherein each facing sheet comprises a metallized and coated polyester film.

12. The method of claim 9 wherein the foam-forming mixture, after passing through the metering gap, is allowed to freely expand before foaming and curing.

13. The method of claim 9 wherein the regulating means comprises a dispenser for depositing the foam-forming mixture and two spaced opposed constricting members which are located downstream from the dispenser and lie one above the other and form therebetween a metering gap for distributing the deposited foam-forming mixture over the carrier.

14. The method of claim 13 wherein each constricting member comprises a horizontal rotatable roll.

15. The method of claim 13 wherein the advancing composite of upper and lower facing sheets and intermediate foam-forming mixture, after passing through the metering gap, is thereafter passed from the metering gap into a heated expansion zone, whereby the foam-forming mixture expands and cures in contact with the facing sheets to form the rollable rigid foam.

16. The method of claim 9 wherein the foam-forming mixture comprises a polyisocyanate, a polyol, a surfactant, a catalyst, and a blowing agent selected from the group comprising water, air, nitrogen, carbon dioxide, readily volatile organic substances, compounds which decompose to liberate gases and combinations thereof.

17. The method of claim 16 wherein the foam-forming mixture contains at least one additive selected from the group consisting of processing aids, viscosity reducers, flame retardants, dispersing agents, reinforcing agents, plasticizers, mold release agents, stabililzers against aging and weathering, compatibility agents, fungistatic and bacteriostatic substances, dyes, fillers and pigments.

18. The method of claim 16 wherein the polyol comprises a member selected from the group consisting of polyester polyols, polyether polyols and combinations thereof.

19. The method of claim 16 wherein the polyol comprises an aromatic polyester polyol.

\* \* \* \* \*